US 7,845,473 B2

(12) United States Patent
Tomita et al.

(10) Patent No.: US 7,845,473 B2
(45) Date of Patent: Dec. 7, 2010

(54) BRAKE CALIPER STRUCTURE OF STRADDLE SEAT OFF-ROAD VEHICLE

(75) Inventors: Hiroaki Tomita, Wako (JP); Makoto Toda, Wako (JP); Naoki Takayanagi, Ueda (JP)

(73) Assignees: Honda Motor Co., Ltd., Tokyo (JP); Nissin Kogyo Co., Ltd., Ueda-shi, Nagano (JP)

( * ) Notice: Subject to any disclaimer, the term of this patent is extended or adjusted under 35 U.S.C. 154(b) by 916 days.

(21) Appl. No.: 11/219,221

(22) Filed: Sep. 2, 2005

(65) Prior Publication Data

US 2006/0049007 A1    Mar. 9, 2006

(30) Foreign Application Priority Data

Sep. 3, 2004    (JP)    ............... 2004-257201

(51) Int. Cl.
    *F16D 65/14*    (2006.01)
(52) U.S. Cl. ................. 188/73.45; 188/71.1; 188/73.39
(58) Field of Classification Search ............. 188/73.44, 188/73.45, 71.1, 73.39, 73.1, 73.46
    See application file for complete search history.

(56) References Cited

U.S. PATENT DOCUMENTS

| 4,334,598 | A | * | 6/1982 | Portolese | ................. | 188/73.44 |
| 4,438,832 | A |   | 3/1984 | Nomura |   |   |
| 4,781,273 | A | * | 11/1988 | Fujinami | ................. | 188/73.42 |
| 4,832,161 | A | * | 5/1989 | Weiler et al. | ............. | 188/73.44 |
| 4,926,979 | A | * | 5/1990 | Odaka | ..................... | 188/73.44 |
| 5,472,068 | A | * | 12/1995 | Weiler et al. | ............. | 188/73.44 |
| 5,526,904 | A | * | 6/1996 | Walden et al. | ........... | 188/73.45 |
| 5,927,446 | A | * | 7/1999 | Evans | ....................... | 188/73.44 |
| 5,931,267 | A | * | 8/1999 | Iwata et al. | .............. | 188/73.45 |
| 6,340,076 | B1 | * | 1/2002 | Tsuchiya | ................. | 188/73.45 |
| 6,382,368 | B2 | * | 5/2002 | Iwata et al. | ................... | 188/74 |
| 6,397,983 | B1 | * | 6/2002 | Roszman et al. | ......... | 188/73.44 |

FOREIGN PATENT DOCUMENTS

| EP | 0989320 | 11/2000 |
| GB | 2087997 | 6/1982 |
| JP | 56-113838 | 9/1981 |
| JP | S62-178482 | 8/1987 |
| JP | 1-21096 | 6/1989 |
| JP | 04-71828 | 6/1992 |
| JP | 06-109039 | 4/1994 |
| JP | 2000-104764 | 4/2000 |
| JP | 53-109074 | 1/2009 |

* cited by examiner

*Primary Examiner*—Bradley T King
*Assistant Examiner*—James K Hsiao
(74) *Attorney, Agent, or Firm*—Rankin, Hill & Clark LLP

(57) ABSTRACT

A brake caliper structure of a straddle seat off-load vehicle includes a brake caliper having a caliper bracket, a caliper assembly connected to the caliper bracket by two connecting portions so that the caliper assembly can move relative to the caliper bracket to clamp a brake disc. One connecting portion includes a slide pin connected to the caliper assembly and slidably received in a guide hole in the caliper bracket for effectively guiding movement of the caliper assembly relative to the caliper bracket, and the other connecting portion includes a connecting screw as a fixed pin secured to the caliper bracket, and a rubber bushing as an elastic member disposed between the caliper assembly and the fixed pin for taking up the tilting of the brake disc.

15 Claims, 7 Drawing Sheets

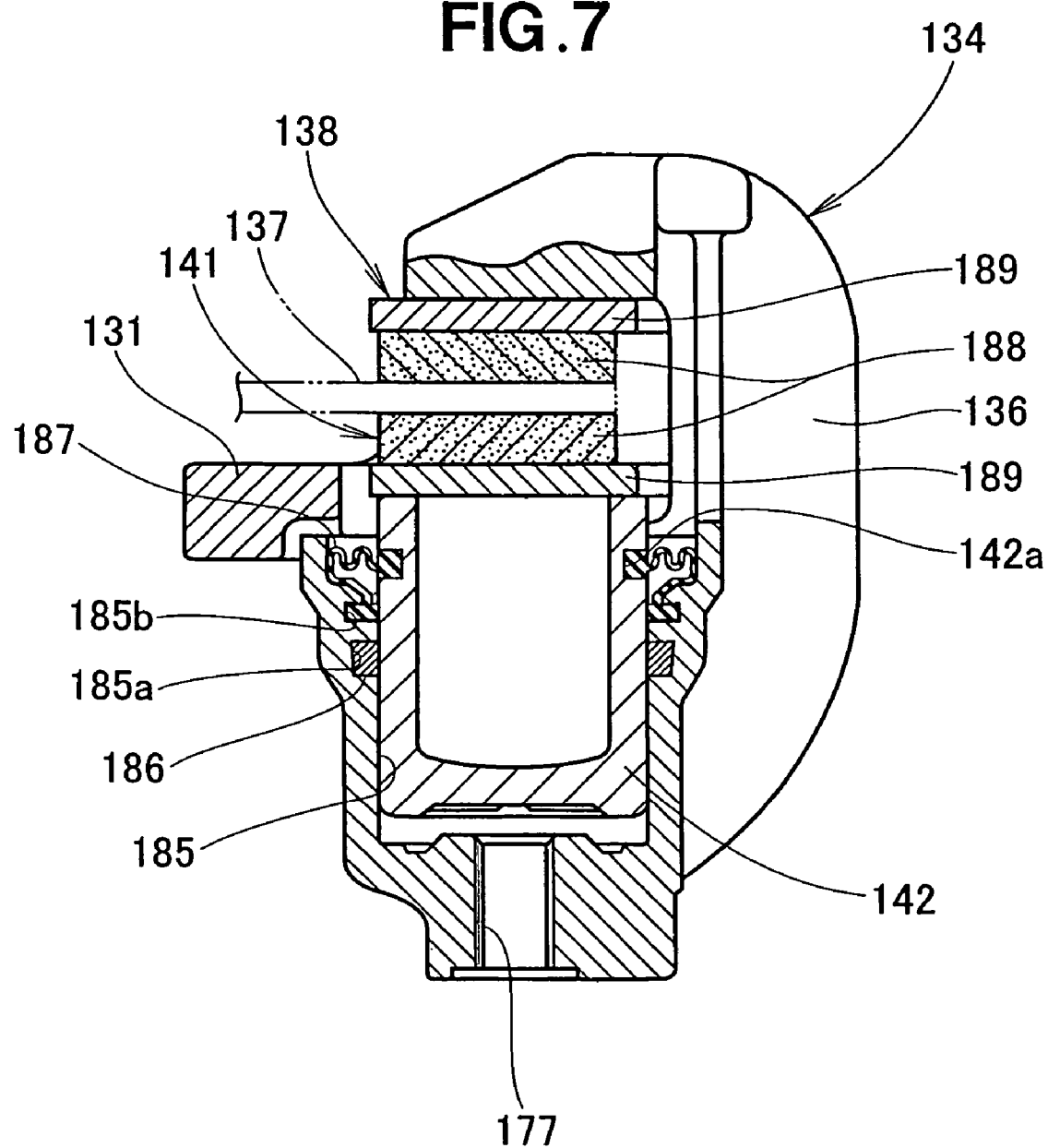

BRAKE CALIPER STRUCTURE OF STRADDLE SEAT OFF-ROAD VEHICLE

FIELD OF THE INVENTION

This invention relates generally to a disc brake of an off-road vehicle with a seat designed to be straddled by the operator and, more particularly to a caliper structure of the disc brake of such straddle seat off-road vehicle.

BACKGROUND OF THE INVENTION

A brake caliper structure of the straddle seat off-road vehicle of the type concerned is disclosed, for example, in Japanese Utility Model Publication (JP-UM-B) No. 01-21096. The disclosed caliper structure includes a brake caliper movably connected to a pair of arms of a bracket bolted to support arms of a knuckle so that the arms extend astride an outer circumference of a brake disc. The brake caliper has two caliper pins extending parallel to an axis of rotation of the brake disc and slidably received via elastic bushings in holes formed in the respective arms of the bracket. Thus, the caliper is slidably mounted on the bracket.

With this arrangement, when a wheel rotatably mounted on the knuckle tilts in or out due to a force applied from a lateral direction thereof, the brake disc is tilted as it is integrally mounted on a hub of the wheel. In this instance, a tilt of the brake disc can be taken up or accommodated by the brake caliper because the brake caliper is elastically supported by the elastic bushings to the brackets. However, since the elastic bushings allow the brake caliper to tilt to a greater extent relative to the bracket, a care should be taken to insure smooth movement of the brake caliper relative to the bracket.

SUMMARY OF THE INVENTION

It is accordingly an object of the present invention to provide a brake caliper structure of a straddle seat off-road vehicle, which is capable of taking up the tilting of a brake disc and also smoothly guiding movement of a movable part of the brake caliper relative to a stationary bracket.

According to the invention, there is provided a brake caliper structure of a straddle seat off-road vehicle which includes a wheel-in disc brake accommodated in a wheel and having a brake disc secured to a hub of the wheel for rotation therewith, a knuckle rotatably supporting the hub via a bearing, and an axle shaft secured to the hub for rotation therewith. The brake caliper structure comprises a brake caliper including a fixed part mounted to the knuckle, a movable part, two connecting portions interconnecting the fixed part and the movable part so that the movable part is movable relative to the fixed part in a direction parallel to an axis of rotation of the wheel, a pair of friction pads for clamping the brake disc, and a piston movably disposed in the movable part for forcing the friction pads against the brake disc. One of the connecting portions includes a guide hole formed in the fixed part and extending parallel to the axis of rotation of the wheel, and a slide pin connected to the movable part and slidably received in the hole of the fixed part, and the other connecting portion includes a fixed pin secured to the fixed part and extending parallel to the axis of rotation of the wheel, and an elastic member disposed between the movable part and the fixed pin.

By virtue of the first connecting portion including the slide pin, the movement of the movable part relative to the fixed part can be effectively guided as the slide pin slides in an axial direction within the guide hole formed in the fixed part. Furthermore, at the other connecting portion including the elastic member, the movable part is elastically mounted to the fixed part. With this arrangement, the elastic member effectively takes up or absorbs the tilting of the brake disc, so that the movable part can properly follow the tilting of the brake disc.

In one preferred form of the invention, the mounting portion including the elastic member is disposed on a leading side of the brake caliper from which the brake disc moves in the brake caliper when the brake disc is rotating in a forward direction. This arrangement ensures that the brake caliper can readily follow up the tilting of the brake disc.

Preferably, the one connecting portion of the brake caliper further includes a metal sleeve press-fitted in the fixed part and having an axial hole forming the guide hole in which the slide pin is slidably received. The other connecting portion of the brake caliper may further include a sleeve fitted around the fixed pin. In this instance, the elastic member preferably comprises a rubber bushing fitted around the sleeve and also fitted in a mount hole formed in the movable part. The other connecting portion of the brake caliper may further include grease packed between the sleeve and the rubber bushing.

BRIEF DESCRIPTION OF THE DRAWINGS

A one preferred structural embodiment of the present invention will be described in detail herein below, by way of example only, with the reference to the accompanying drawings, in which:

FIG. 7 is a cross-sectional view taken along the line VII-VII of FIG. 6A.

DETAILED DESCRIPTION OF THE PREFERRED EMBODIMENT

Figure 1:
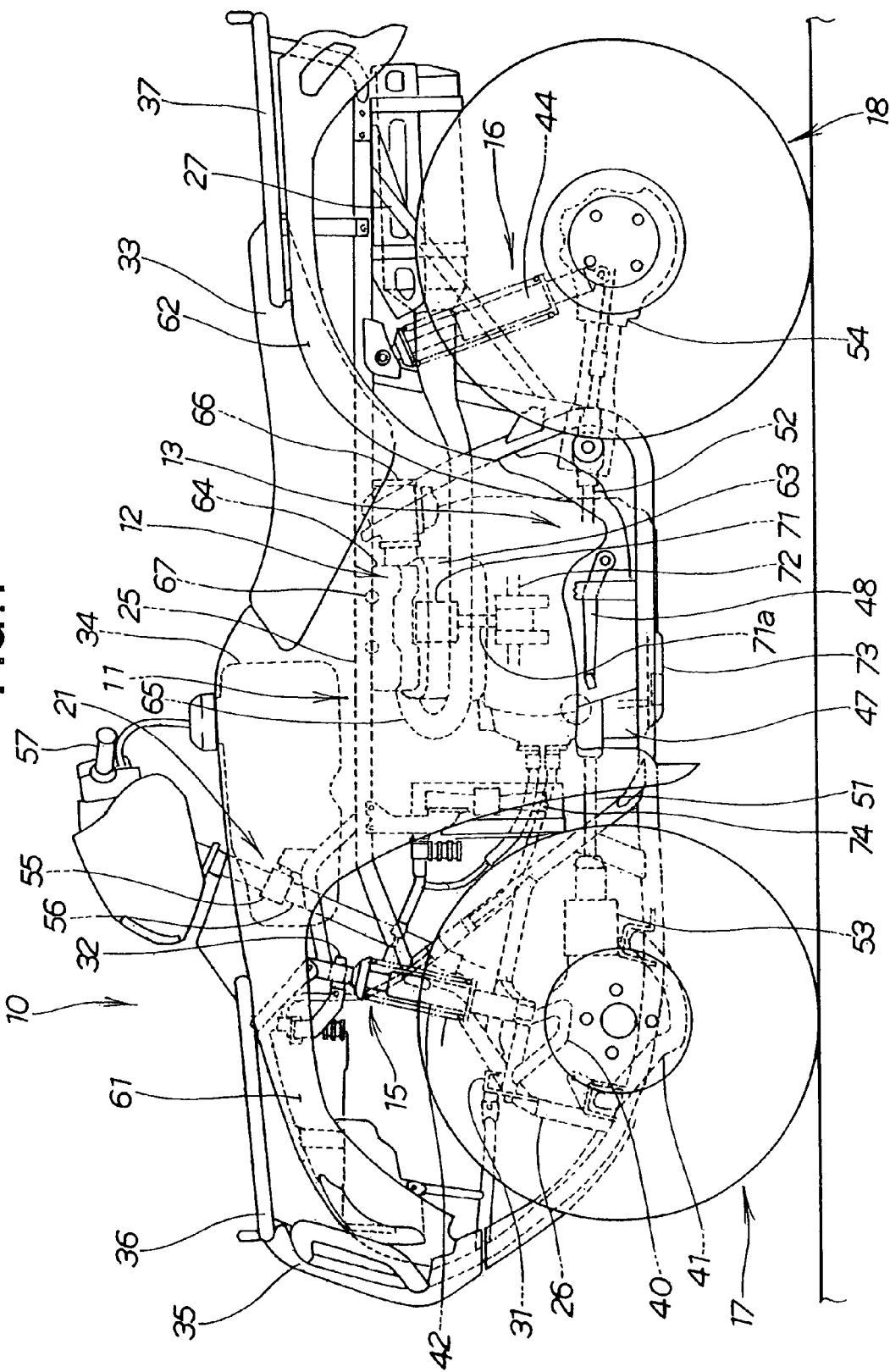
FIG. 1 is a side view of an off-road vehicle with straddle seat in which a brake caliper structure according to the present invention is incorporated.

Referring now to the drawings and FIG. 1 in particular, there is shown an off-road vehicle 10 having a seat designed to be straddled by the operator or driver, in which a brake caliper structure according to the present invention is incorporated. The straddle seat off-road vehicle will be hereinafter referred to, for brevity, as "off-road vehicle".

The off-road vehicle 10 is a four-wheel drive (4WD) vehicle and includes a body frame 11, an engine 12 mounted on a central lower part of the body frame 11, a power train 13 operatively coupled with the engine 12 and mounted on the body frame 11, front and rear suspensions 15 and 16 connecting the body frame 11 to left and right front wheels 17 and left and right rear wheels 18, respectively, and a steering device 21 operatively connected to the front wheels 17 and mounted to the body frame 11.

The body frame 11 consists of a main frame 25, a front frame 26 connected to a front end of the main frame 25, a rear frame 27 connected to a rear end of the main frame 25, a bracket 31 extending between left and right lower parts of the front frame 26, and a cross member 32 extending between left and right upper parts of the front frame 26. Reference numeral 33 denotes a seat mounted on the main frame 25; 34 a fuel tank; 35 a front guard attached to the front frame 26; 36 a front carrier mounted to the front frame 26; and 37 a rear carrier mounted to a rear part of the main frame 25.

The front suspension 15 that links each front wheel 17 to the body frame 11 is an independent suspension and includes a front upper arm 40 and a front lower arm 41 both hinged to the body frame 11 for undergoing pivotal movement in a vertical plane, and a front cushion unit or shock absorber 42 provided between the front upper arm 40 and the cross member 32. The rear suspension 16 includes a rear cushion unit or shock absorber 44 mounted to the body frame 11.

The power train 13 includes a transmission 47 connected to an output shaft of the engine 12, a gear change pedal 48, a front drive shaft 51 and a rear drive shaft 52 extending from a front side and a rear side, respectively, of the transmission 47, a front final reduction gear 53 coupled to the front drive shaft 51 and mounted to the body frame 11, and a rear final reduction gear 54 coupled to the rear drive shaft 52 and mounted to the body frame 11.

The steering device 21 includes a steering shaft 56 mounted to a front upper part of the main frame 25 via a shaft holder 55, and a steering handlebar 57 connected to the steering shaft 56. Reference numeral 61 denotes a front fender for covering an upper part of each front wheel 17, and reference numeral 62 denotes a rear fender for covering an upper part of each rear wheel 18.

The engine 12 is a four-stroke cycle engine and includes a cylinder block 63, a cylinder head 64 attached to an upper end of the cylinder block 63, an exhaust device 65 connected to a front portion of the cylinder head 64, a carburetor 66 connected to a rear portion of the cylinder head 64, a valve mechanism 67 disposed in the cylinder head 64, one or more pistons 71 slidably mounted in the cylinder bock 63, a crankshaft 72 connected to each piston via a connecting rod 71a, an oil pan 73 disposed below the cylinder block 63, and a cooling fan 74 disposed forwardly of the engine 12 for forced cooling of the engine 12.

Figure 2:
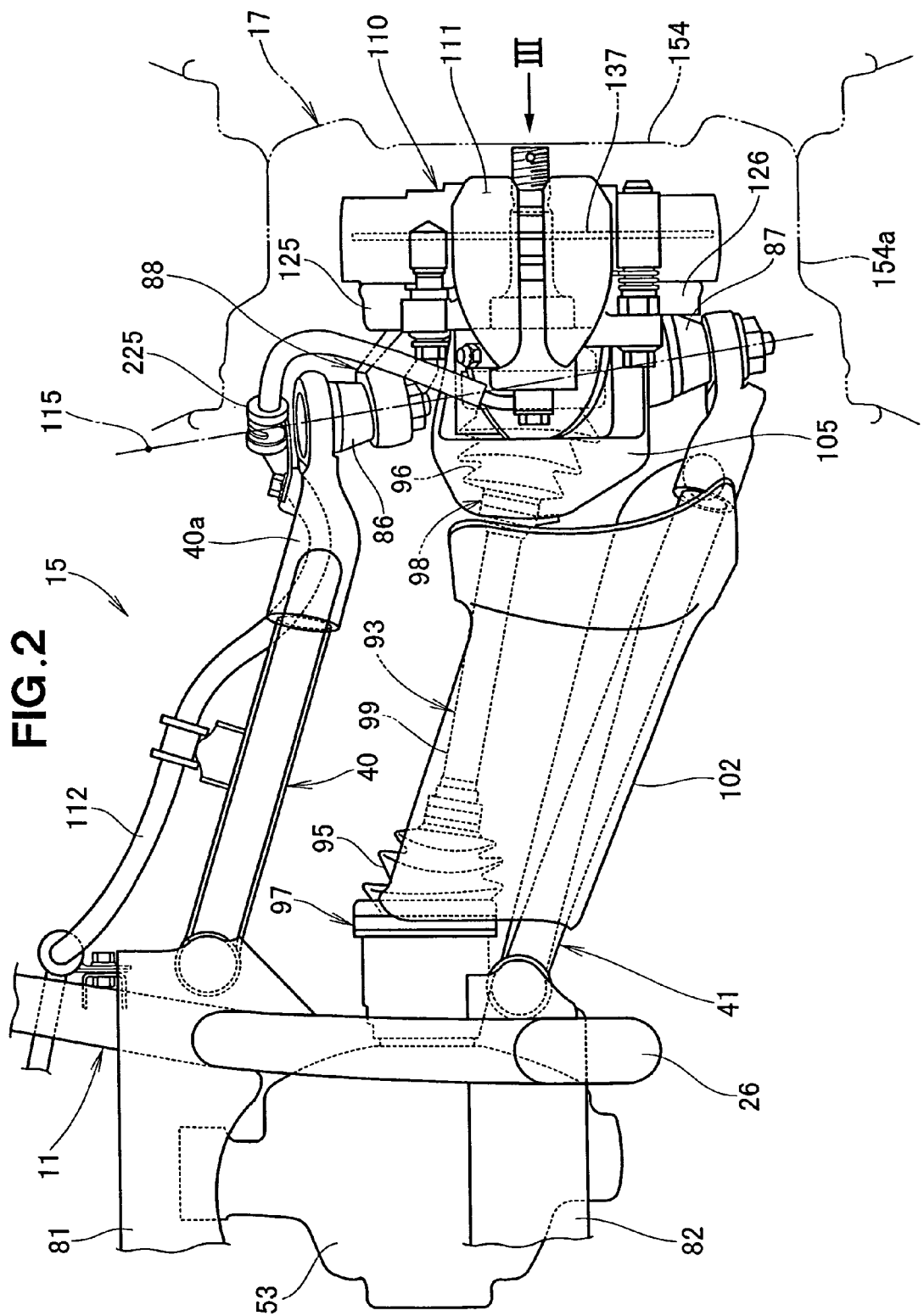
FIG. 2 is a front elevational view of a main part of a front suspension of the off-road vehicle.

FIG. 2 shows in front elevation a left part of the front suspension 15 which is used to link the left front wheel 17 to the body frame 11. The right part of the front suspension 15 is identical in structure to the left part and a further description thereof can be omitted. The front suspension 15 for the left front wheel 17 includes an upper arm support portion 81 and a pair of lower arm support portions 82 (only a front one being shown) that are mounted to the body frame 11 and extend transversely of the body frame 11. The lower arm support portions 82 are spaced in a longitudinal direction of the body frame 11. The front upper arm 40 is hinged to an end of the upper arm support portion 81, and the front lower arm 41 is hinged to one end of the lower arm support portions 82. The front suspension 15 also includes a knuckle 88 connected to distal ends of the front upper and lower arms 40, 41 via ball joints 86, 87. A hub 146 (FIG. 4) of the left front wheel 17 is rotatably connected to the knuckle 88. The cushion unit 42 (FIG. 1) of the front suspension 15 is provided to act between the body frame 11 and the front upper arm 40.

The knuckle 88 has a first arm 125 and a second arm 126 spaced vertically, and a brake caliper 111 of a disc brake 110 is mounted on the first and second arms, 125, 126 of the knuckle 88. The disc brake 110 includes a brake disc 137 secured to the hub 146 (FIG. 4) of the left front wheel 17, and the brake caliper 111 that clamps friction pads against the brake disc 137. The disc brake 110 is of the so-called "wheel-in" type, which is fully accommodated inside a wheel 154 around which a tire is fitted to form the front wheel 17.

The front final reduction gear 53 is coupled to a front end of the front drive shaft 51 (FIG. 1) extending forwardly from a front lower portion of the transmission 47 (FIG. 1). The front final reduction gear 53 transmits through an axle shaft 93 to the hub 146 (FIG. 4) to thereby rotate the front wheel 17. The axle shaft 93 is connected at opposite ends to constant velocity joints 97, 98 covered by rubber boots 95, 96. An inboard side guard member 102 is mounted to the front lower arm 41 so as to cover a front side and a front lower side of each of the rubber boot 95 and a shaft body 99 of the axle shaft 93. Similarly, an outboard side guard member 105 is mounted to the knuckle 88 so as to cover a front side of the rubber boot 96.

The brake caliper 111 of the disc brake 110 is connected via a brake hose 112 to a master cylinder (not shown) disposed on a side of the steering handlebar 57 (FIG. 1). The brake hose 112 is secured at plural portions thereof to the front upper arm 40 and the body frame 11. One such secured brake hose portion is defined by the position of a bracket 225, which is located in alignment with a king pin axis 115 above the distal end 40a of the front upper arm 40, the kingpin axis 115 extending between respective centers of the ball joints 86, 87.

Figure 3:
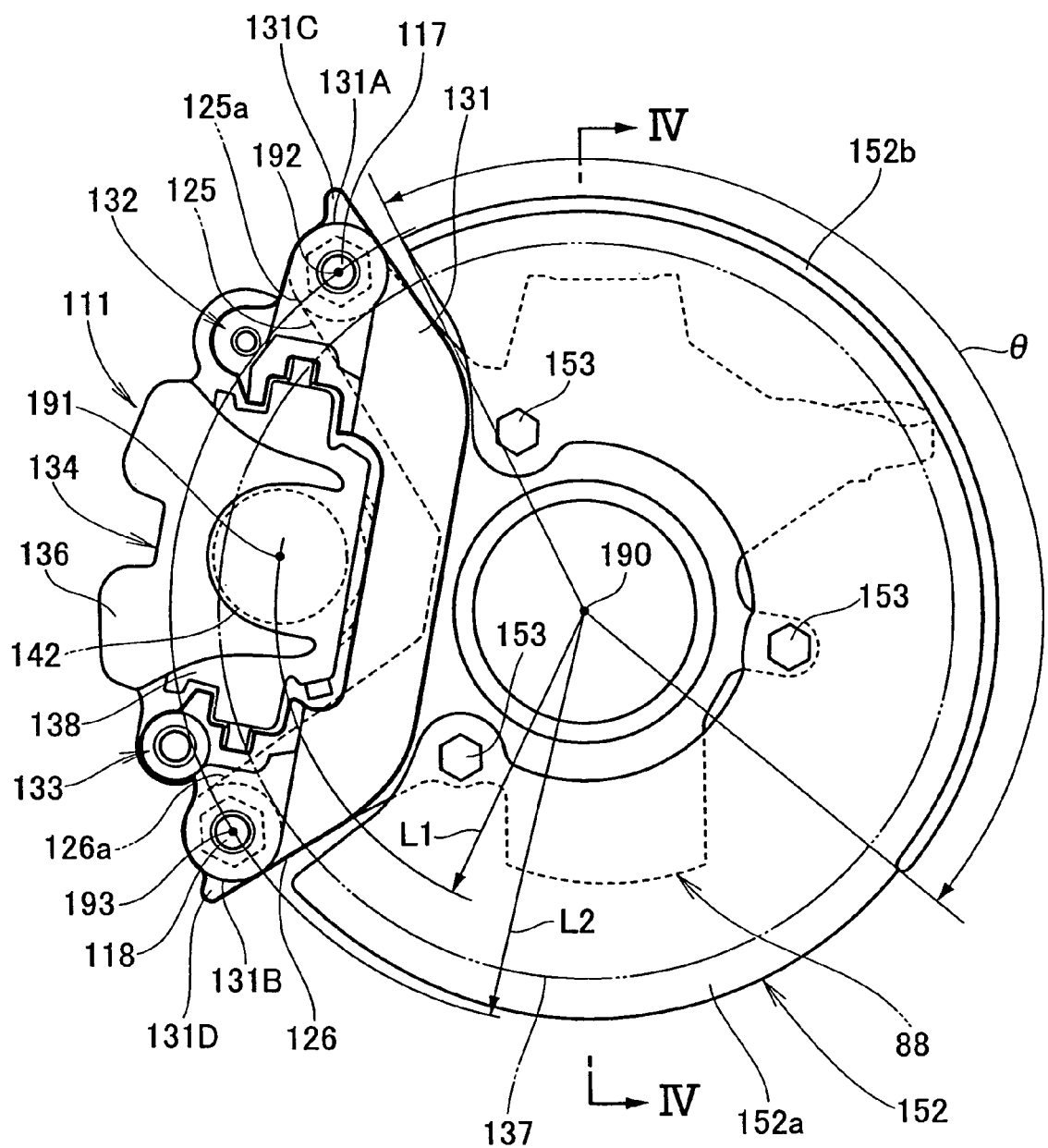
FIG. 3 is a view looking in a direction of the arrow III of FIG. 2, showing the brake caliper structure of the present invention.

FIG. 3 is a view looking in a direction of the arrow III of FIG. 2. As shown in this figure, the brake caliper 111 is mounted by a pair of bolts 117, 118 to a first caliper support portion 125a at the distal end of the first arm 125 and a second caliper support portion 126a at the distal end of second arm 126, respectively, of the knuckle 88.

The brake caliper 111 is formed by a caliper bracket 131 bolted to the first and second arms 125, 126 of the knuckle 88, and a caliper assembly 134 connected to the caliper bracket 131 via first and second connecting portions 132 and 133. The caliper bracket 131 forms a fixed part of the brake caliper 111 while the caliper assembly 134 forms a movable part of the brake caliper 111, which is movable relative to the fixed part, as will be described later. In FIG. 3, a thicker solid line is used to profile the caliper bracket 131 for clarity. The caliper bracket 131 has first and second mounting portions 131A and 131B for attachment to the first and second caliper support portions 125a, 126a of the first and second arms 125, 126, respectively, of the knuckle 88. The caliper assembly 134 includes a caliper body 136 connected to the caliper bracket 131, a pair of friction pads 138, 141 (one pad 141 being shown in FIG. 7) disposed inside the caliper body 136 for clamping the brake disc 137, and a piston 142 movably disposed inside the caliper body 136 so that it can push the friction pads 138, 141 against the brake disc 137.

As shown in FIG. 3, a distance L1 from the axis 190 of rotation of the front wheel 17 (FIG. 1) to the axis 191 of the piston 142 is made smaller than a distance L2 from the rotational axis 190 of the wheel 17 to the respective axes 192, 193 of the bolts 117, 118 (L1<L2). This means that the bolts 117, 118 used for mounting the brake caliper 111 to the knuckle 88 are disposed radially outward of the axis 191 of the piston 142. By thus arranging the bolts 117, 118 relative to the piston 142, it is possible to reduce loads acting on the bolts when the friction pads 138, 141 (or portions of the respective friction pads 138, 141 corresponding to the axis of the piston 142) are subjected to a brake torque at the time of braking of the off-road vehicle.

Figure 4:
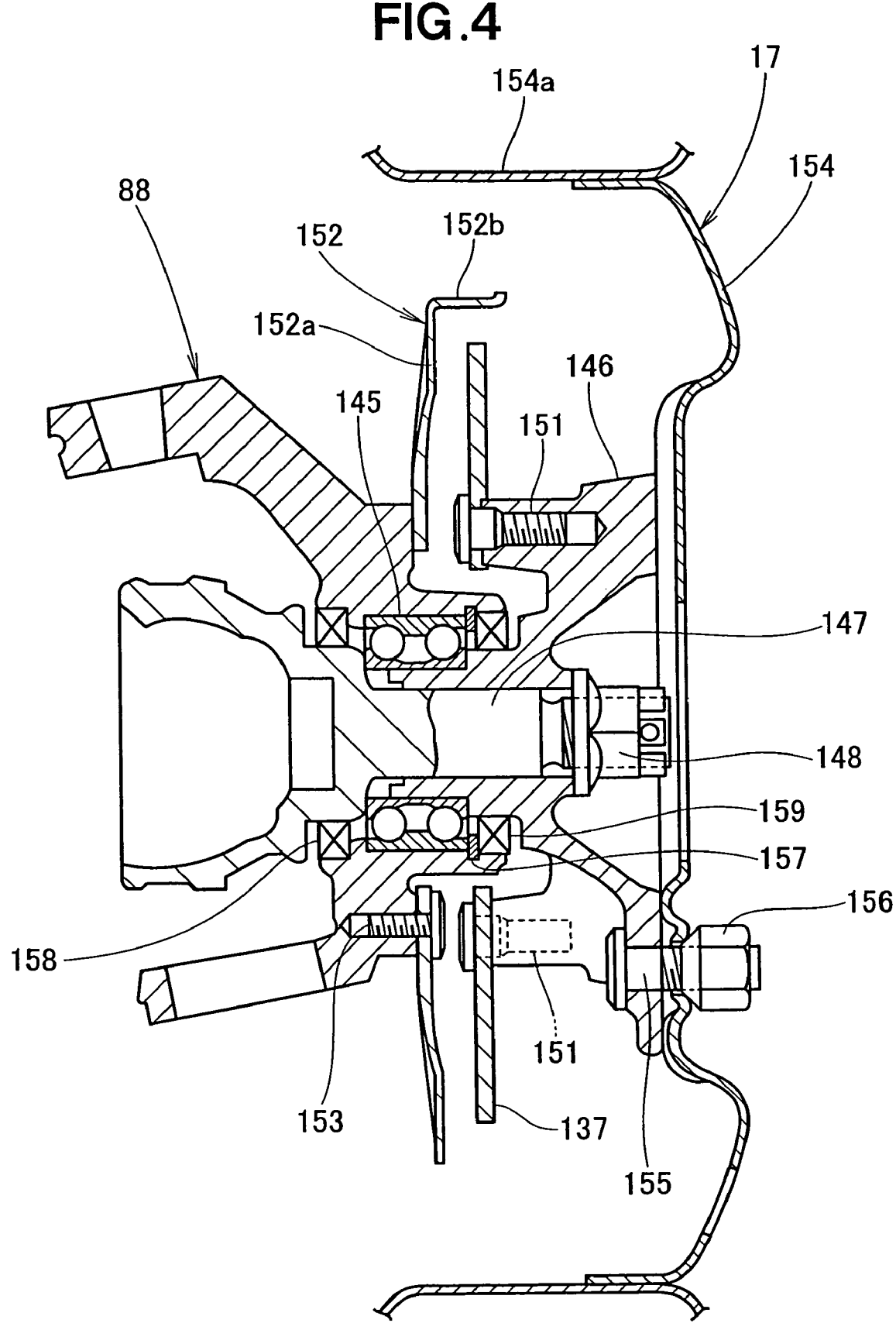
FIG. 4 is a cross-sectional view taken along the line IV-IV of FIG. 3.

FIG. 4 is a cross-sectional view taken along the line IV-IV of FIG. 3. As shown in this figure, the hub 146 of the wheel 17 is rotatably mounted on the knuckle 88 via a bearing 145, and an axle shaft 147 having one end formed with one part of the constant velocity joint 98 (FIG. 2) is spline-coupled to the hub 146 and secured to the latter by a nut 148. The brake disc 137 is secured to the hub 146 by a plurality of screws 151. In order to cover the brake disc 137 from a lateral inward direction thereof, a cover member 152 is attached to the knuckle 88 by a plurality of screws 153 (only one being shown) in concentric relation with the brake disc 137. The cover member 152 includes a central disc portion 152a disposed in confrontation with the brake disc 137 and having an outside diameter larger than an outside diameter of the brake disc 137, and a flange portion 152b extending along that part of an outer peripheral edge of the disc portion 152a which extends from an upper end of the cover member 152 located adjacent to the caliper 111 in a rearward and downward direction over an angle .theta. (FIG. 3), so as to cover upper and rear portions of an outer peripheral edge of the brake disc 137. The wheel 154 is firmly connected to the hub 146 by means of a plurality of lug nuts 156 (only one being shown in FIG. 4) secured to threaded wheel studs 155. Reference character 154a denotes a rim of the wheel 154; 157 a stop ring associated with the bearing 145; and 158, 159 dust seals for protection of the bearing 145.

Figure 5:
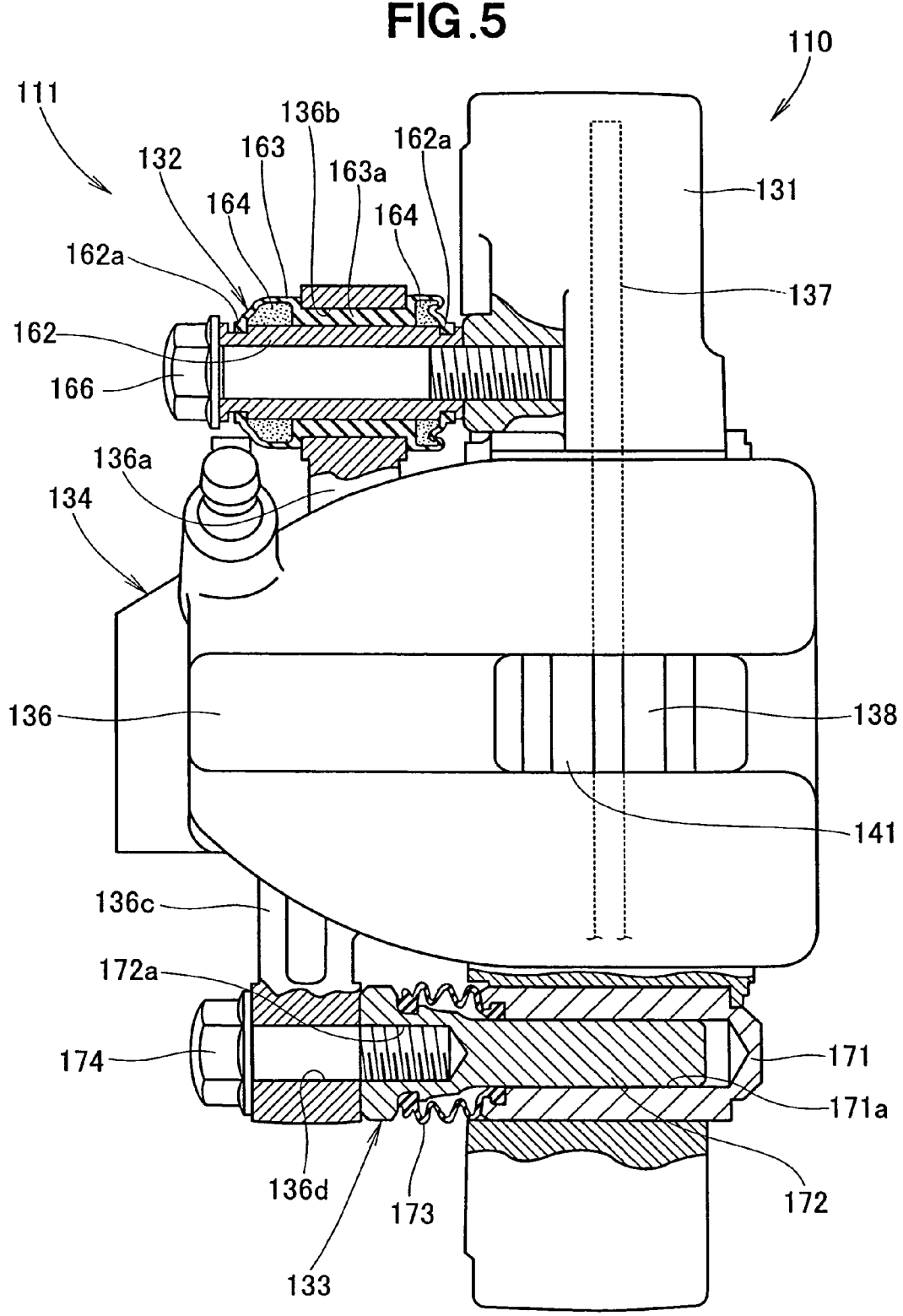
FIG. 5 is a front elevational view with parts in cross section of the brake caliper structure of the invention.

FIG. 5 shows in cross section the first and second connecting portions 132 and 133 of the brake caliper structure that are used for attachment of the caliper assembly 134 to the caliper bracket 131. As shown in this figure, the first connecting portion 132 includes a sleeve 162 formed with annular grooves 162a, 162a at opposite end portions thereof, a rubber bushing 163 fitted around the sleeve 162 and having opposite ends fitted in the annular grooves 162a, 162a of the sleeve 162, grease 164 packed between the sleeve 162 and the rubber bushing 163 for lubrication, and a connection screw 166 extending through the sleeve 162 and threaded into the caliper bracket 131. The rubber bushing 163 has a thick central cylindrical portion 163a fitted in a mount hole 136b formed in an arm portion 136a of the caliper body 136. The connecting screw 166 forms a fixed pin secured to the caliper bracket (fixed part) 131 and extending parallel to the axis of rotation 190 (FIG. 3) of the front wheel 17.

The second connecting portion 133 includes a metal sleeve 171 press-fitted in the caliper bracket 131, a slide pin 172 slidably received in an axial guide hole 171a of the sleeve 171, a rubber boot 173 mounted to close or seal a clearance between the sleeve 171 and the slide pin 172, and a screw 174 for connecting the slide pin 172 to an arm portion 136c of the caliper body 136. The screw 174 extends through a mount hole 136d formed in the arm portion 136c and is threaded into an axial threaded hole 172a of the slide pin 172. The axial guide hole 171a of the sleeve 171 and the slide pin 172 slidably received there in extend parallel to the axis of rotation 190 (FIG. 3) of the front wheel 170.

The brake caliper 111 of the foregoing construction is of the so-called "floating" type wherein the caliper assembly 134 is held in a floating condition relative to the caliper bracket 131. By virtue of the rubber bushing 163 disposed between the arm portion 136a and the sleeve 162, the caliper body 136 of the caliper assembly 134 is rubber mounted (i.e., elastically mounted) to the caliper bracket 131 at the first connecting portion 132 of the brake caliper structure. On the other hand, at the second connecting portion 133 of the brake caliper structure, the caliper body 136 of the caliper assembly 134 is slidably mounted to the caliper bracket 131 via a metal-to-metal contact between the slide pin 172 and the sleeve 171 so that the caliper assembly 134 can move left and right in FIG. 5 as a reaction of reciprocating movement of the piston 142 (FIG. 3) disposed inside the caliper body 136.

With this arrangement, when the brake disc 137 is caused to tilt inward or outward of the vehicle, the first connecting portion 132 including the rubber bushing 163 enables the caliper assembly 134 to properly follow the tilting of the brake disc 137 while the second connecting portion 133 including the slide pin 172 insures smooth guiding of the movement of the caliper assembly 134 relative to the caliper bracket 131. The friction pads 138, 141 of the caliper assembly 134 can thus be always held in a proper position relative to the brake disc 137, improving brake performance of the off-road vehicle.

Figures 6A, 6B:
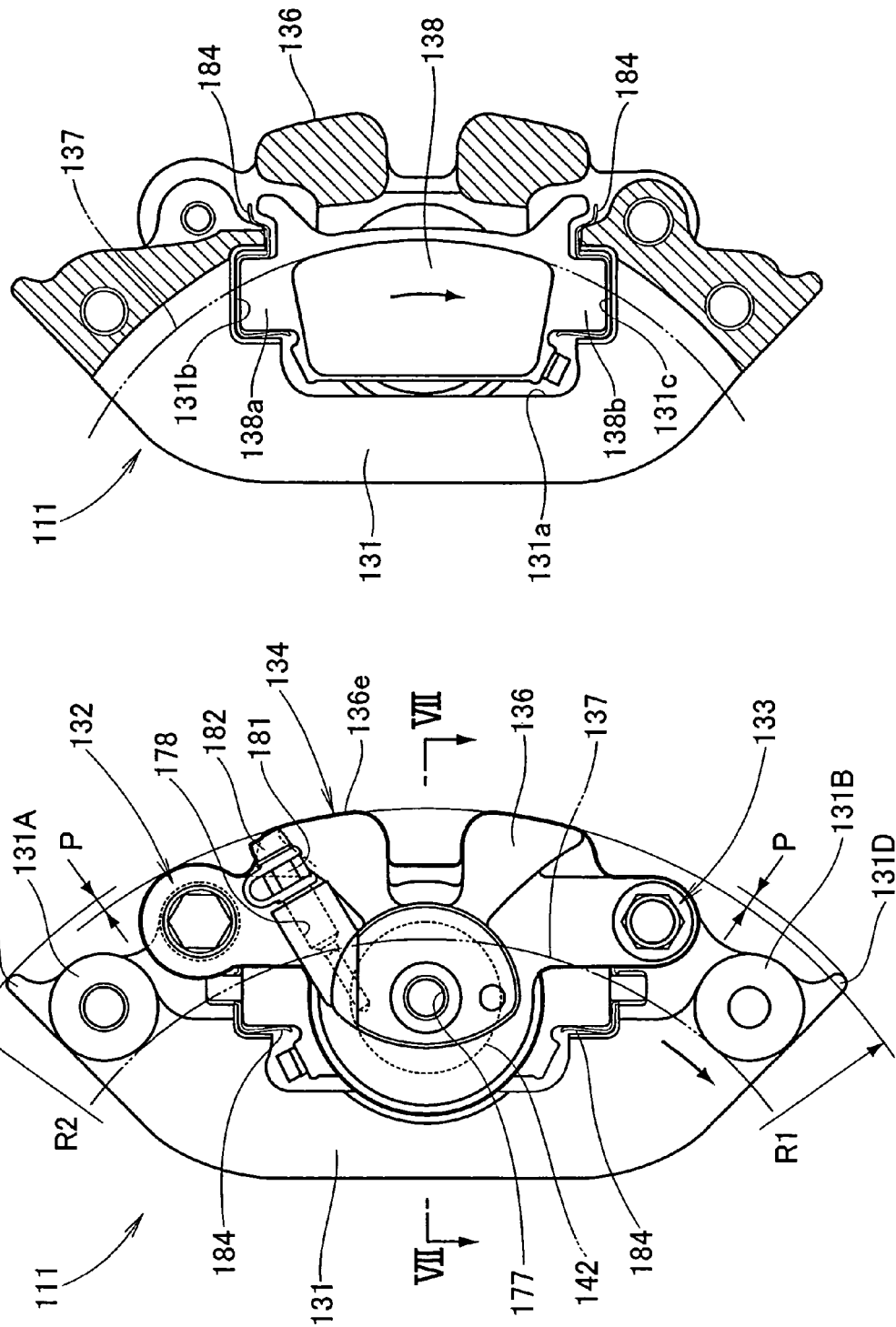
FIG. 6A is a front elevational view of a brake caliper of the brake caliper structure.
FIG. 6B is a view similar to FIG. 6A but shown with parts removed to show an internal structure of the brake caliper.

FIG. 6A shows the brake caliper 111 as seen from the backside of FIG. 3. In FIG. 6A, a thicker solid line is used to profile the caliper body 136 for clarity. As shown in this figure, the first connecting portion 132 is disposed on a leading side (also called "entrance side") of the brake caliper 111 where the brake disc 137 while rotating in a forward direction (i.e., a rotating direction when the vehicle is traveling forward) moves in or enters the brake caliper 111. On the other hand, the second connecting portion 133 is disposed on a trailing side (also called "exit side") of the brake caliper 111 where the brake disc 137 rotating in the forward direction moves out or exits from the brake caliper 111.

The caliper bracket 131 has a pair of radial projections 131C and 131D disposed in the proximity of the first and second mounting portions 131A and 131B, respectively, and extending in a radial outward direction to the extent that a distance R2 from the rotational axis 190 (FIG. 3) of the front wheel 17 (FIG. 2) to tip ends of the radial projections 131C, 131D is larger than a distance R1 from the rotational axis 190 of the front wheel 17 to an outer circumferential surface 136e of the caliper body 136 which is most distant from the rotational axis 190 of the front wheel 17. The difference between R2 and R1 is designated by P, which represents a projecting amount of the radial projections 131C, 131D relative to the outer circumferential surface 136e of the caliper body 136.

The caliper body 136 has an internally threaded hose connection hole 177 formed in a side surface thereof for connection to an end of the brake hose 112 (FIG. 2), and a bleed hole 178 for bleeding air from a cylinder bore 185 (FIG. 7) formed in the caliper body 136. A mouth ring 181 is fitted in an outlet opening of the bleed hole 178, and a cap 182 is fitted over the mouth ring 181.

FIG. 6B is a view similar to FIG. 6A but shown with an upper part of the caliper body 136 cut-away to show an inside structure of the brake caliper 111. As shown in this figure, the friction pad 138 has pair of projecting portions 138a, 138b formed as integral end extensions of the friction pad 138 and projecting from opposite ends of the friction pad 138 substantially along a direction of rotation of the brake disc 137. The caliper bracket 131 has an opening 131a receiving therein the friction pad 138. The opening 131a has a pair of cutout portions or recesses 131b, 131c for engagement with the projecting portions 138a, 138b, respectively, of the friction pad 138.

The projecting portions 138a, 138b and the cutout recesses 131b, 131c used in pairs serve as a torque retaining portion, which retains a brake torque produced when the friction pads 138, 141 (FIG. 5) clamp the brake disc 137 to slow and stop the latter. In the case where the brake disc 137 rotating in the forward direction as indicated by the arrow in FIG. 6B is clamped by the friction pads 138, 141, the projecting portion 138b and the cutout recess 131c together form the torque retaining portion. On the other hand, the projecting portion 138a and the cutout recess 131b together form the torque retaining portion when the friction pads 138, 141 clamp the brake disc 137 rotating in a reverse direction. Reference numeral 184 denotes a leaf spring disposed between each of the cutout recesses 131b, 131c and a respective one of the projecting portions 138a, 138b so as to keep the friction pad 138 stably in position against wobbling when the friction pad 138 is set in the opening 134a of the caliper bracket 131.

FIG. 7 is a cross sectional view taken along the line VII-VII of FIG. 6A. As shown in this figure, the piston 142 of the caliper assembly 134 is slidably received in the cylinder bore 185 formed in the caliper body 136. When hydraulic pressure inside the cylinder bore 185 pushes the piston 142 against the inboard friction pad 141, reaction to this hydraulic pressure moves the caliper assembly 134 relative to the caliper bracket 131, pulling the outboard friction pad 138 against the brake disc 137. Thus, the friction pads 138, 141 clamp the brake disc 137 to slow and stop the brake disc 137. The friction pads 138, 141 each consist of a brake lining 188 of friction material bonded to a metal back plate 189.

A seal member is fitted in an annular groove 185a formed in a circumferential wall of the cylinder bore 185, so as to provide a seal between the cylinder bore 185 and the piston 145. In order to prevent dust and dirt and water from entering between the piston 142 and the cylinder bore 185, a rubber boot 187 is mounted to extend between another annular groove 185b formed in the circumferential wall of the cylinder bore 185 and an annular groove 142a formed in an outer cylindrical surface of the piston 142.

As thus far described, the brake caliper structure of the invention is embodied in a straddle seat off-road vehicle 10 (FIG. 1) including a wheel-in disc brake 110 (FIG. 2) accommodated in a wheel 17 and having a brake disc 137 (FIG. 4) secured to a hub 146 of the wheel for rotation therewith, a knuckle 88 rotatably supporting the hub 146 via a bearing 145, and an axle shaft 147 secured to the hub for rotation therewith. The brake caliper structure comprises a brake caliper 111 (FIG. 5) including a caliper bracket 131 as a fixed part mounted to the knuckle 88, a caliper assembly 134 as a movable part, two connecting portions 132, 133 interconnecting the caliper bracket (fixed part) 131 and the caliper assembly (movable part) 134 so that the caliper assembly 134 is movable relative to the caliper bracket 131 in a direction parallel to an axis of rotation of the wheel 17, a pair of friction pads 138, 141 for clamping the brake disc 137, and a piston 142 movably disposed in the caliper assembly 134 for forcing the friction pads 138, 141 against the brake disc 137. One of the connecting portions 133 includes a guide hole 171a formed in the caliper bracket (fixed part) 131 and extending parallel to the axis of rotation of the wheel, and a slide pin 172 connected to the caliper assembly (movable part) 134 and slidably received in the guide hole of the caliper bracket 131. The other connecting portion 132 includes a connecting screw 166 as a fixed pin secured to the caliper bracket (fixed part) 131 and extending parallel to the axis of rotation of the wheel, and a rubber bushing 163 as an elastic member disposed between the caliper assembly (movable part) 134 and the fixed pin (connecting screw) 166.

With the brake caliper structure of the foregoing construction, the movement of the caliper assembly (movable part) 134 relative to the caliper bracket (fixed part) 131 can be effectively guided by the connecting portion 133 including the slide pin 172 on the caliper assembly 134 slidably received in the guide hole 171a in the caliper bracket 131. Furthermore, at the connecting portion 132 including the rubber bushing (elastic member) 163, the caliper assembly (movable part) 134 is elastically mounted to the caliper bracket (fixed part) 131. With this arrangement, the rubber bushing (elastic member) 163 effectively takes up or absorbs the tilting of the brake disc 137, so that the caliper assembly (movable part) can properly follow the tilting of the brake disc 137.

Preferably, the mounting portion 132 including the rubber bushing (elastic member) 163 is disposed on a leading side of the brake caliper 111 from which the brake disc 137 moves in the brake caliper 111 when the brake disc 137 is rotating in a forward direction, which is the direction achieved when the vehicle is traveling forward. This arrangement ensures that the brake caliper 111 can readily follow up the tilting of the brake disc 137.

The brake caliper structure of the present invention can be also effectively used when employed in an off-road motorcycle or a three-wheeled off-road vehicle.

Obviously, various minor changes and modifications are possible in the light of the above teaching. It is to be understood that within the scope of the appended claims the present invention may be practiced otherwise than as specifically described.

What is claimed is:

1. A brake caliper structure of a straddle seat off-road vehicle including a wheel-in disc brake accommodated in a wheel and having a brake disc secured to a hub of the wheel for rotation therewith, a knuckle rotatably supporting the hub via a bearing, and an axle shaft secured to the hub for rotation therewith, the brake caliper structure comprising:
a brake caliper including a fixed part mounted to the knuckle, a movable part, two connecting portions interconnecting the fixed part and the movable part so that the movable part is movable relative to the fixed part in a direction parallel to an axis of rotation of the wheel, a pair of friction pads for clamping the brake disc, and a piston movably disposed in the movable part for forcing the friction pads against the brake disc,
wherein one of the connecting portions includes a guide hole formed in the fixed part and extending parallel to the axis of rotation of the wheel, a slide pin connected to the movable part and slidably received in the guide hole of the fixed part, and a metal sleeve press-fitted in the fixed part and having an axial hole forming the guide hole in which the slide pin is slidably received, and the other connecting portion includes a fixed pin secured to the fixed part and extending parallel to the axis of rotation of the wheel through a mount hole formed in the movable part, and an elastic member disposed between the movable part and the fixed pin, wherein the elastic member coaxially extends with the fixed pin through an entire length of the mount hole, a cylindrical portion of the elastic member extending through the entire length of the mount hole having a constant radial thickness, and the movable part is slidably and elastically mounted on the fixed pin via the elastic member disposed therebetween, the cylindrical portion effectively absorbing tilting of the disc brake so that the movable part can properly follow tilting of the disc brake.

2. The brake caliper structure according to claim 1, wherein the brake caliper has a leading side from which the brake disc moves in the brake caliper when the brake disc is rotating in a forward direction, and the other mounting portion including the elastic member is disposed on the leading side of the brake caliper.

3. The brake caliper structure according to claim 1, wherein the other connecting portion of the brake caliper further includes a sleeve fitted around the fixed pin, and the elastic member comprises a rubber bushing fitted around the sleeve and also fitted in the mount hole formed in the movable part, the cylindrical portion of the elastic member being in constant contact with a portion of the sleeve extending through the mount hole.

4. The brake caliper structure according to claim 3, wherein the other connecting portion of the brake caliper further includes grease packed between the sleeve and the rubber bushing.

5. A brake caliper structure for a straddle seat off-road vehicle with wheels, comprising:
a fixed part connected to the vehicle;
a movable part that is movable relative to the fixed part in a direction parallel to an axis of rotation of the wheels;
a first connecting portion that interconnects the fixed part and the movable part, including
a slide pin connected to the movable part and slidably received in a guide hole formed through the fixed part, and
a metal slide-pin sleeve press-fitted within the guide hole for slidable receipt of the slide pin in the fixed part, the fixed part being configured to limit an axial position of the slide-pin sleeve within the guide hole; and
a second connecting portion that interconnects the fixed part and the movable part, including
a fixed pin secured to the fixed part and extending parallel to the axis of rotation of the wheel, and
an elastic member that is a rubber bushing fitted around a fixed pin sleeve and fitted in a mount hole formed in the movable part, wherein the elastic member is disposed between the movable part and the fixed pin and coaxially extends with the fixed pin through an entire length of the mount hole, a cylindrical portion of the elastic member extending through the entire length of the mount hole being in constant contact with the fixed pin sleeve, and wherein the movable part is slidably and elastically mounted on the fixed pin via the elastic member disposed therebetween.

6. The brake caliper structure according to claim 5, wherein the brake caliper structure has a leading side from which a brake disc moves in the brake caliper structure when the brake disc is rotating in a direction that is synonymous with forward movement of the vehicle, and the elastic member is disposed on the leading side of the brake caliper structure.

7. The brake caliper structure according to claim 5, wherein the second connecting portion further includes grease packed between the fixed pin sleeve and the rubber bushing.

8. The brake caliper structure according to claim 5, wherein the first connecting portion further includes a guide hole formed in the fixed part and extending parallel to the axis of rotation of the wheels.

9. The brake caliper structure according to claim 8, wherein the slide pin is slidably received in the guide hole of the first connecting portion.

10. A brake caliper structure of a straddle seat off-road vehicle including a wheel-in disc brake accommodated in a wheel and having a brake disc secured to a hub of the wheel for rotation therewith, a knuckle rotatably supporting the hub via a bearing, and an axle shaft secured to the hub for rotation therewith, the brake caliper structure comprising:
a brake caliper including a fixed part mounted to the knuckle, a movable part, two connecting portions interconnecting the fixed part and the movable part so that the movable part is movable relative to the fixed part in a direction parallel to an axis of rotation of the wheel, a pair of friction pads for clamping the brake disc, and a piston movably disposed in the movable part for forcing the friction pads against the brake disc,
wherein one of the connecting portions includes a guide hole formed in the fixed part and extending parallel to the axis of rotation of the wheel, and a slide pin connected to the movable part and slidably received in the guide hole of the fixed part, and the other connecting portion includes a fixed pin secured to the fixed part and extending parallel to the axis of rotation of the wheel through a mount hole formed in the movable part, a sleeve fitted around the fixed pin and an elastic member disposed between the movable part and the fixed pin, wherein said elastic member is a rubber bushing that coaxially extends with the fixed pin through an entire length of the mount hole, a cylindrical portion of the elastic member extending through the entire length of the mount hole having a constant radial thickness and being in constant contact with the sleeve, and the movable part is slidably and elastically mounted on the fixed pin via the rubber bushing disposed therebetween.

11. The brake caliper structure according to claim 10, wherein the fixed pin of the other connecting portion extends loosely through the mount hole, the other connecting portion of the brake caliper further includes the sleeve fitted around the fixed pin, and the rubber bushing is fitted around the sleeve and also fitted in the mount hole formed in the movable part, and the rubber bushing extends axially through the mount hole of the movable part.

12. The brake caliper structure according to claim 11, wherein the other connecting portion of the brake caliper further includes grease packed between the sleeve and the rubber bushing.

13. The brake caliper structure according to claim 3, wherein the elastic member is a continuous member that is comprised of:
a central cylindrical portion disposed in the mount hole; and
first and second ends that are disposed at opposite axial ends of the cylindrical portion and are shaped to create first and second voids, respectively, between the elastic member and the sleeve.

14. The brake caliper structure according to claim 5, wherein the elastic member is a continuous member that is comprised of:
the central cylindrical portion disposed in the mount hole; and
first and second ends that are disposed at opposite axial ends of the cylindrical portion and are shaped to create first and second voids, respectively, between the elastic member and the sleeve.

15. The brake caliper structure according to claim 11, wherein the elastic member is a continuous member that is comprised of:
the central cylindrical portion disposed in the mount hole; and
first and second ends that are disposed at opposite axial ends of the cylindrical portion and are shaped to create first and second voids, respectively, between the elastic member and the sleeve.

* * * * *